(12) United States Patent
Shinohara

(10) Patent No.: US 7,384,162 B2
(45) Date of Patent: Jun. 10, 2008

(54) VEHICLES OUTSIDE MIRROR WITH WALL PORTION HIDING SHAFT

(75) Inventor: Teruaki Shinohara, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 27 days.

(21) Appl. No.: 11/148,425

(22) Filed: Jun. 9, 2005

(65) Prior Publication Data

US 2006/0001988 A1    Jan. 5, 2006

(30) Foreign Application Priority Data

Jun. 10, 2004    (JP) .............................. 2004-172982

(51) Int. Cl.
*B60R 1/06*    (2006.01)

(52) U.S. Cl. ...................................... 359/841

(58) Field of Classification Search ................ 359/841, 359/877, 872
See application file for complete search history.

(56) References Cited

U.S. PATENT DOCUMENTS 4,125,244 A    11/1978    Lukey
5,245,480 A    9/1993    Polzer
6,334,479 B1    1/2002    Pollak et al.

FOREIGN PATENT DOCUMENTS

| EP | 1 138 552 A2 | 10/2001 |
|---|---|---|
| JP | 61-094845 A | 5/1986 |
| JP | 2001-322495 A | 11/2001 |
| JP | 2002-234393 A | 8/2002 |
| JP | 2002-301988 A | 10/2002 |

*Primary Examiner*—Stephone B. Allen
*Assistant Examiner*—Jennifer L Doak
(74) *Attorney, Agent, or Firm*—Foley & Lardner LLP

(57) ABSTRACT

A vehicle outside mirror includes a base that is fixed to a body of a vehicle; a shaft that is fixed to the base; and a mirror assembly that is retractably installed on the shaft. The mirror assembly includes a mirror housing with one side opened and other side closed; a mirror unit that is provided in an opening portion of the mirror housing, having a reflecting surface; and a cover that is fixed to a closed portion of the mirror housing to cover the closed portion. The mirror housing includes a fixed portion that is fixed to the shaft retractably around the shaft via a retractable mechanism; and a wall portion that is provided in such a manner that the shaft and the retractable mechanism are invisible from the opening portion.

3 Claims, 6 Drawing Sheets

VEHICLES OUTSIDE MIRROR WITH WALL PORTION HIDING SHAFT

CROSS-REFERENCE TO RELATED APPLICATIONS

The present document incorporates by reference the entire contents of Japanese priority document, 2004-172982 filed in Japan on Jun. 10, 2004.

BACKGROUND OF THE INVENTION

1. Field of the Invention

The present invention relates to a vehicle outside mirror that is retractable toward a vehicle body (door).

2. Description of the Related Art

As this type of vehicle outside mirror, there is, for example, a technology disclosed in Japanese Patent Application Laid-Open No. 2002-234393. A conventional vehicle outside mirror includes a base fixed to a vehicle body, a retractable shaft (4) fixed to the base, and a mirror assembly retractably provided in the retractable shaft (4) through a retractable mechanism. The mirror assembly includes a mirror body of which one side is opened (or having an opening portion) and the other side is closed (or having a closed portion), a mirror disposed in the opening portion of the mirror body through an operating unit so that a mirror angle is controllable, and a cover that is fixed to the closed portion of the mirror body and covers the closed portion.

The conventional vehicle outside mirror, however, has some problems on its appearance because the shaft and the retractable mechanism (such as a spring, a washer, and a plate) provided in the mirror body are seen from the opening portion of the mirror body through a space between an edge of the opening portion of the mirror body and an edge of the mirror.

SUMMARY OF THE INVENTION

It is an object of the present invention to at least solve the problems in the conventional technology.

A vehicle outside mirror according to one aspect of the present invention, which is retractable toward a body of a vehicle, includes a base that is fixed to the body; a shaft that is fixed to the base; and a mirror assembly that is retractably installed on the shaft. The mirror assembly includes a mirror housing with one side opened and other side closed; a mirror unit that is provided in an opening portion of the mirror housing, having a reflecting surface; and a cover that is fixed to a closed portion of the mirror housing to cover the closed portion. The mirror housing includes a fixed portion that is fixed to the shaft retractably around the shaft via a retractable mechanism; and a wall portion that is provided in such a manner that the shaft and the retractable mechanism are invisible from the opening portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a vehicle outside mirror according to the present invention are explained in detail below with reference to the accompanying drawings. It should be noted that the present invention is not limited by the present embodiments.

Figure 1:
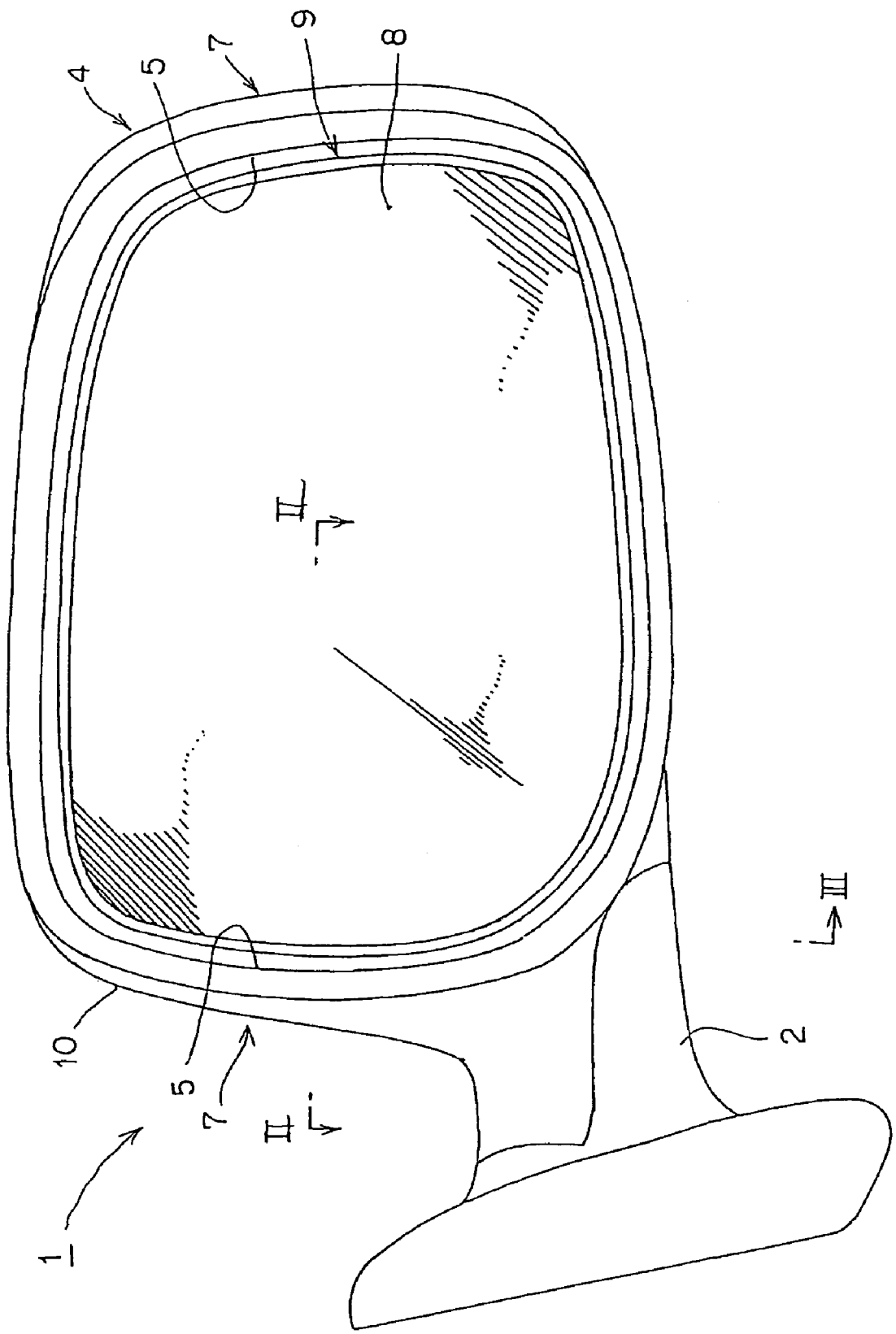
FIG. 1 is a front view of a vehicle outside mirror according to an embodiment of the present invention.
Figure 2:
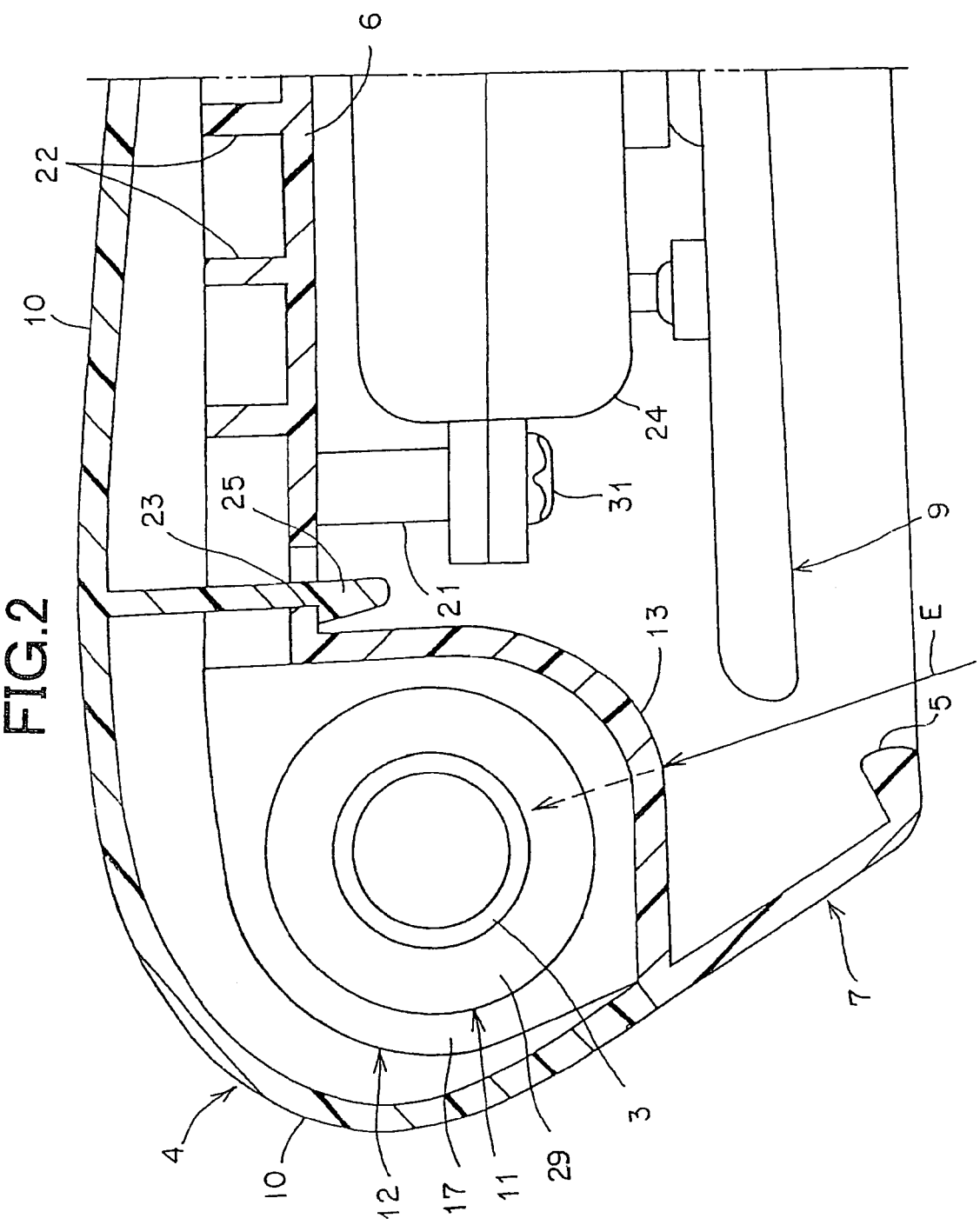
FIG. 2 is a partial horizontal cross-section of a main portion of the vehicle outside mirror, taken along a line II-II of FIG. 1.
Figure 3:
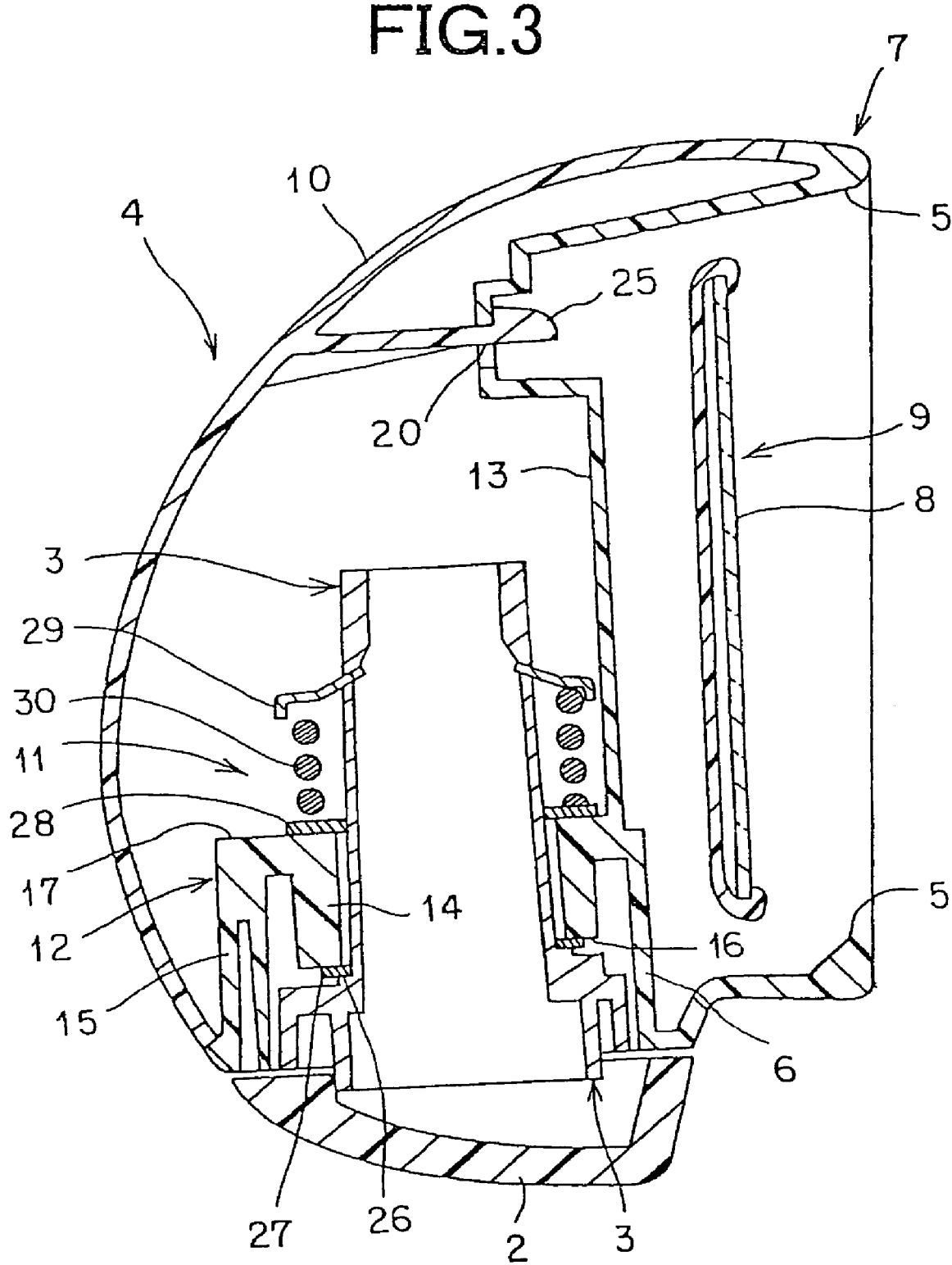
FIG. 3 is a vertical cross-section of the main portion, taken along a line III-III of FIG. 1.

FIG. 1 is a front view of a vehicle outside mirror according to an embodiment of the present invention. FIG. 2 is a partial horizontal cross-section of a main portion of the vehicle outside mirror, taken along a line II-II of FIG. 1. FIG. 3 is a vertical cross-section of the main portion, taken along a line III-III of FIG. 1. According to the present embodiment, the vehicle outside mirror 1 is a door mirror for a vehicle. The door mirror 1 is supposed to be mounted on doors on both sides of the car, although it is not shown. It is noted that the door mirror 1 depicted herein is mounted on the door on the right side of the car, and a door mirror mounted on a door on the left side of the car is almost symmetric to the door mirror 1.

The door mirror 1 includes a base 2 fixed to the door, a shaft 3 fixed to the base 2, and a mirror assembly 4 retractably provided in the shaft 3.

The mirror assembly 4 includes a mirror housing 7, a mirror unit 9, and a cover 10 (a design cover, a garnish, and a shell frame).

Figure 4:
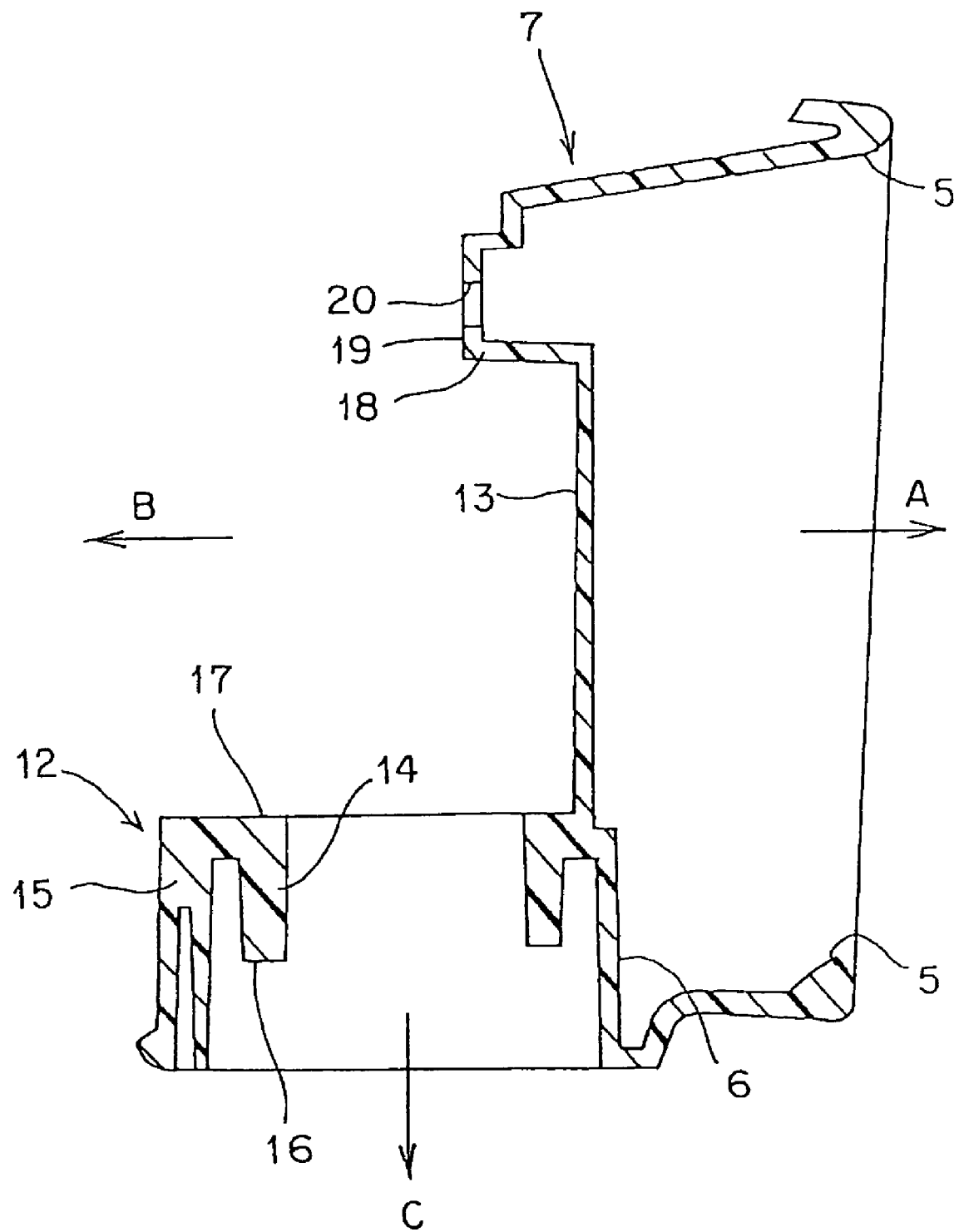
FIG. 4 is a vertical cross-section of a mirror housing of the vehicle outside mirror that indicates a direction in which a die is removed.
Figure 5:
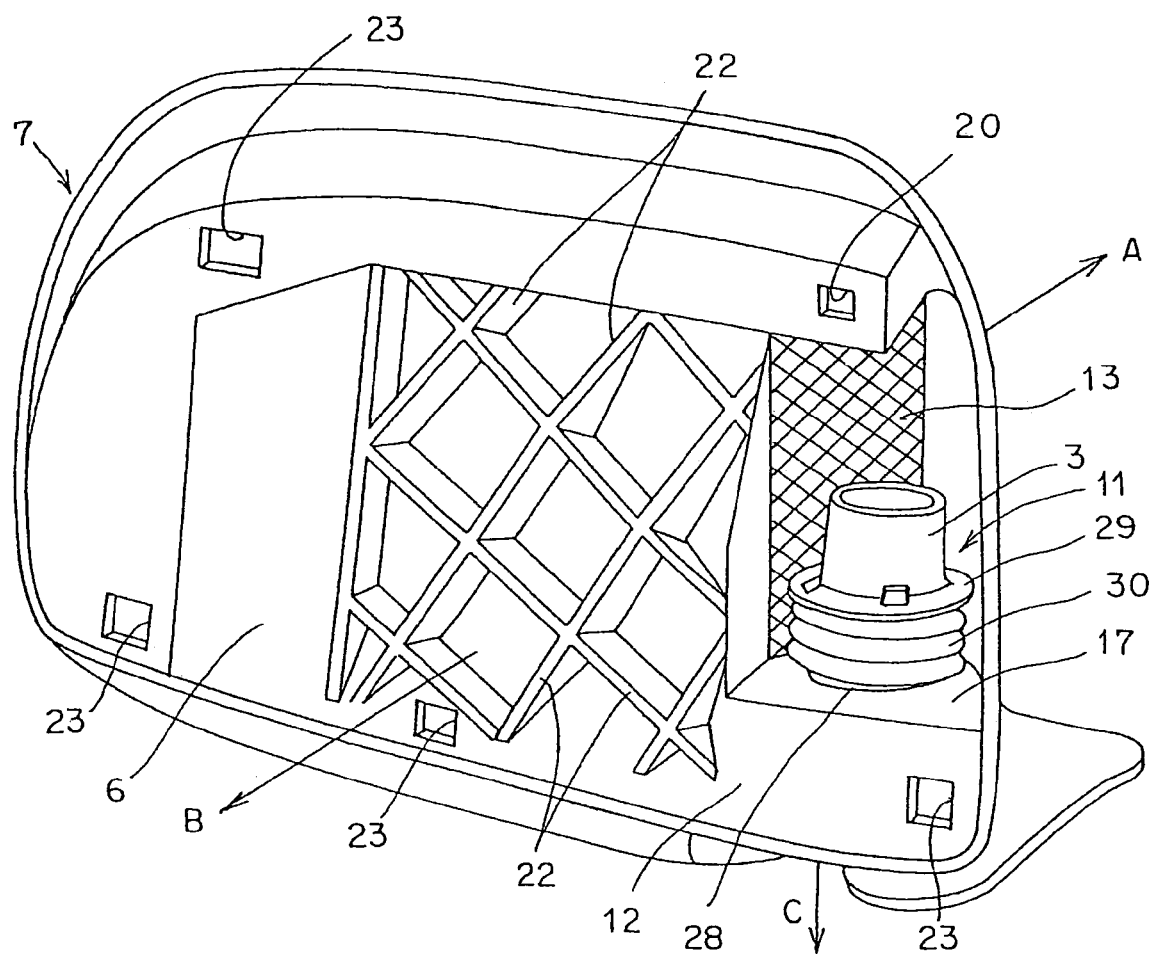
FIG. 5 is a perspective view of the closed portion of the mirror housing that indicates the direction in which the die is removed.
Figure 6:
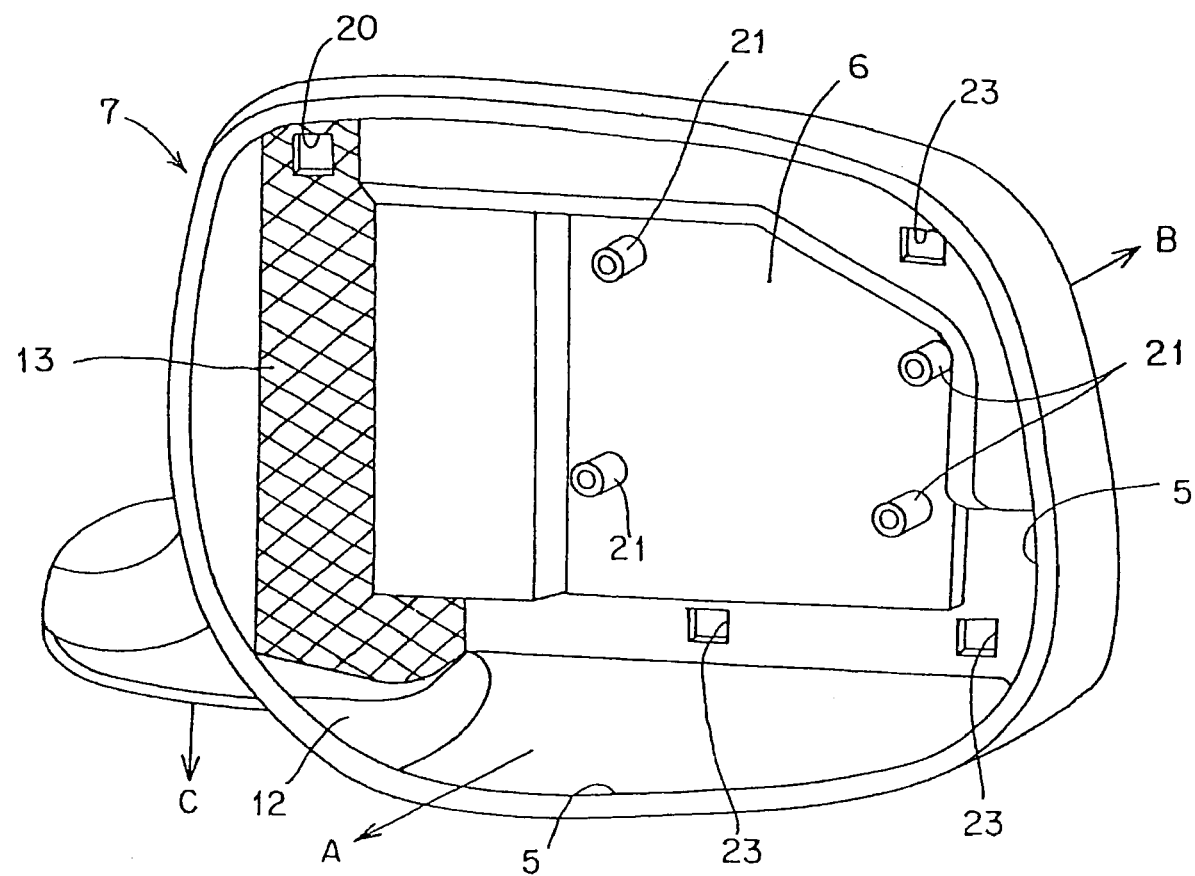
FIG. 6 is a perspective view of the opening portion of the mirror housing that indicates the direction in which the die is removed.

FIG. 4 is a vertical cross-section of a mirror housing of the vehicle outside mirror that indicates a direction in which a die is removed. FIG. 5 is a perspective view of the closed portion of the mirror housing that indicates the direction in which the die is removed. FIG. 6 is a perspective view of the opening portion of the mirror housing that indicates the direction in which the die is removed.

The mirror housing 7 has a hollow shape with its one side 5 that is opened and the other side 6 that is closed. In other words, the mirror housing 7 has a portion 5 provided in its front side that is opened (or an opening portion 5), and another portion 6 (i.e., portions of a rear side, an upper side, a lower side, and left and right sides of the mirror housing 7) that is closed (or a closed portion 6).

The mirror unit 9 has a reflecting surface 8. As shown in FIG. 1 to FIG. 3, the mirror unit 9 is arranged in the opening portion 5 of the mirror housing 7 so that the reflecting surface 8 faces the front side.

The cover 10 is secured to the closed portion 6 of the mirror housing 7, and covers the closed portion 6. In other words, as shown in FIG. 1 to FIG. 3, the cover 10 covers portions of mainly the rear side, the upper side, a part of the side on the left side, and the side on the right side of the closed portion 6.

The mirror housing 7 has a fixed portion 12 that is fixed to the shaft 3 through a retractable mechanism 11 to be retractable around the shaft 3, and a wall portion 13 (each part indicated by a lattice pattern in FIG. 5 and FIG. 6) that blocks the shaft 3 and the retractable mechanism 11 from view so as not to be seen from the opening portion 5.

The fixed portion 12 is formed in the base 2 side (left side) and the lower side of the mirror housing 7. The fixed portion 12 has a double cylindrical shape including an inner cylinder 14 and an outer cylinder 15. The height of the inner cylinder 14 is shorter than the height of the outer cylinder 15. More specifically, one edge (lower edge) of the inner cylinder 14 is positioned in a higher side, which means shorter, than one edge surface of the outer cylinder 15. The one edge (lower edge) of the inner cylinder 14 forms a bottom surface 16 thereof. On the other hand, another edge surface (upper edge surface) of the inner cylinder 14 and another edge surface (upper edge surface) of the outer cylinder 15 form a top surface 17 thereof.

The wall portion 13 is formed from the upper side along the lower side on the base 2 side (left side) of the mirror housing 7. In other words, the wall portion 13 is integrally joined to an upper edge and a lower edge of the opening portion 5 of the mirror housing 7, the upper edge and the lower edge thereof being opposed to each other. The wall portion 13 is joined thereto through the closed portion 6 of the mirror housing 7 and the outer cylinder 15 of the fixed portion 12. In the above manner, the wall portion 13 is formed with a part of the closed portion 6 of the mirror housing 7 and with a part of the outer cylinder 15 of the fixed portion 12. The wall portion 13 is formed in an almost plate shape. Furthermore, a part of the wall portion 13 corresponding to the upper edge of the mirror housing 7 has a recess portion 18 when viewed from the opening portion 5 (or a projection portion when viewed from the closed portion 6). A bottom portion 19 of the recess portion 18 (or a top portion of the projection portion) has an engagement hole 20 as a secure portion used to secure the cover 10 therewith.

In the mirror housing 7, the opening portion 5, the closed portion 6, the fixed portion 12, and the wall portion 13 are formed by using a first die (not shown) that is a slide die. Further, the closed portion 6, the fixed portion 12, and the wall portion 13 are formed by using a second die (not shown) that is an ordinary die. Furthermore, the fixed portion 12 is formed by using a third die (not shown) that is an ordinary die. The first die is removed in the direction of arrow A shown in FIG. 4 to FIG. 6 after a core portion of the first die is slid. The second die is removed as it is in the direction of arrow B in FIG. 4 to FIG. 6. The third die is removed as it is in the direction of arrow C in FIG. 4 through FIG. 6.

In the mirror housing 7, a plurality pieces, for example, four pieces of fixing boss parts 21 are integrally provided on the surface of the opening portion 5 side (front surface) of the closed portion 6. Stiffening ribs 22 in diagonal lattice are also integrally provided on the surface of the opposite side (rear surface) to the opening portion 5 side of the closed portion 6. Furthermore, a plurality of pieces, for example, four pieces of small rectangular engagement holes 23 are provided in the edge side of the mirror housing 7, of the closed portion 6.

A power unit 24 is secured to the fixing boss part 21 of the mirror housing 7 by a screw 31. The mirror unit 9 is fixed to the power unit 24 to be pivotal vertically nearly around its horizontal axis and horizontally nearly around its vertical axis. As explained above, the mirror housing 7 has also a function as a fixing member (fixing bracket and fixing frame) for fixing the mirror unit 9 through the power unit 24.

Elastic engagement claws 25 are integrally provided in the inner surface of the cover 10 (the surface that faces the closed portion 6 of the mirror housing 7) corresponding to the engagement holes 20 and 23, respectively. By elastically engaging the elastic engagement claws 25 of the cover 10 with the edges of the engagement holes 20 and 23 of the mirror housing 7, the cover 10 is secured to the mirror housing 7.

The shaft 3 is secured to the base 2 at its one end (lower end). A step portion 26 is provided in the one end (lower end) of the shaft 3. The retractable mechanism 11 includes a lower washer 27, an upper washer 28, a push nut 29, and a compression type spring 30. The lower washer 27 is provided between a top surface of the step portion 26 of the shaft 3 and the bottom surface 16 of the inner cylinder 14 of the fixed portion 12. The upper washer 28 is provided on the top surface 17 of the fixed portion 12. The push nut 29 is secured to the other end (upper end) of the shaft 3, and the compression type spring 30 is provided between the push nut 29 and the upper washer 28.

A driver of the vehicle can visually recognize the rear side of the vehicle through the reflecting surface 8 of the mirror unit 9. Then, by driving the power unit 24, the mirror unit 7 is made to pivot vertically nearly around its horizontal axis and horizontally nearly around its vertical axis. This allows the position of the reflecting surface 8 to be adjusted to get to driver's eye level.

The mirror assembly 4 is then manually turned around the shaft 3 in a clockwise direction or a counterclockwise direction with force greater than spring force of the spring 30. With the force, the mirror assembly 4 is rotated around the shaft 3 in the clockwise direction or the counterclockwise direction and is stored. When the force greater than the spring force of the spring 30 is applied to the mirror assembly 4, the mirror assembly 4 rotates in the clockwise direction or the counterclockwise direction for shock absorption.

The door mirror 1 has the wall portion 13 provided in the mirror housing 7 so that the shaft 3 and the retractable mechanism 11 are blocked from view from the opening portion 5 of the mirror housing 7. Therefore, the door mirror 1 is configured so that the shaft 3 and the retractable mechanism 11 are blocked from view from the opening portion 5 of the mirror housing 7 by the wall portion 13 provided in the mirror housing 7. In other words, as shown in FIG. 2, even if the internal side of the mirror housing 7 is tried to be looked into from the opening portion 5 of the mirror housing 7 through a space between an edge of the opening portion 5 and an edge of the mirror unit 9 (indicated by solid arrow E of FIG. 2), only the wall portion 13 is seen. This wall portion 13 blocks the shaft 3 and the retractable mechanism 11 from view from outside (indicated by dashed arrow of FIG. 2). Accordingly, the appearance of the door mirror 1 is improved.

As for the mirror housing 7 of the door mirror 1 in particular, the first die that is the slide die is used to form the opening portion 5, the closed portion 6, the fixed portion 12, and the wall portion 13. The second die that is the ordinary die is used to form the closed portion 6, the fixed portion 12, and the wall portion 13. And then, the third die that is the ordinary die is used to form the fixed portion 12. Therefore, the conventional die can be used as they are to form the door mirror 1. Moreover, in the door mirror 1, the wall portion 13 of the mirror hosing 7 has an almost plate shape, which allows the structure of the die to be slightly simpler (e.g., there is no need to do boundary alignment between a cavity die and a core part of the slide die). Therefore, the manufacturing costs can be reduced accordingly.

In the door mirror 1, the wall portion 13 is integrally joined to the upper edge and the lower edge, which face each other, of the opening portion 5 of the mirror housing 7 through the closed portion 6 and the fixed portion 12. This allows improved rigidity of the mirror housing 7 of the door mirror 1.

Furthermore, the door mirror 1 has the recess portion 18 provided in a part of the wall portion 13 corresponding to the upper edge of the mirror housing 7. The engagement hole 20 is provided in the bottom portion 19 of the recess portion 18. Therefore, in the door mirror 1, the recess portion 18 that forms a kind of rib structure allows improvement of strength of a portion where the elastic engagement claw 25 of the cover 10 is elastically engaged therewith, and of strength of the mirror housing 7 itself. Moreover, the door mirror 1 has the engagement hole 20 provided in the upper edge of the mirror housing 7, and therefore, the upper edge of the mirror housing 7 is the portion with which the elastic engagement claw 25 of the cover 10 is elastically engaged. Thus, the strength of the elastic engagement therein is improved as compared with the strength of the elastic engagement at the center part of the mirror housing 7. In other words, the rigidity of the upper edge of the mirror housing 7 is higher than that of the center part thereof, which allows improvement of the elastic engagement.

According to the present invention, a shaft and a retractable mechanism are invisible from an opening portion by a wall portion provided in a mirror housing. Therefore, an exterior appearance of a vehicle outside mirror can be improved.

Although the door mirror is explained in the present embodiment so far, the present invention can also be applied to other vehicle outside mirrors such as a fender mirror and a truck mirror.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle outside mirror apparatus configured to be manually retractable toward a body of a vehicle, the vehicle outside mirror apparatus comprising:
   a base that is fixed to the body;
   a shaft that is fixed to the base;
   a manual retractable mechanism configured to retract the vehicle outside mirror apparatus manually toward the body of the vehicle; and
   a mirror assembly that is retractably installed on the shaft,
   wherein
   the mirror assembly includes:
      a mirror housing that has an opening portion and a closed portion;
      a mirror unit that is provided in the opening portion of the mirror housing, the mirror unit having a reflecting surface; and
      a cover that is fixed to a closed portion of the mirror housing to cover the closed portion, and
   the mirror housing includes:
      a fixed portion that is fixed to the shaft retractably around the shaft via the retractable mechanism-for allowing retraction, the fixed portion being formed on the base and the lower side of the mirror housing, the fixed portion comprising an outer cylinder; and
      a wall portion that is provided between the opening portion and the fixed portion in such a manner that the shaft and the manual retractable mechanism are invisible from any point of the opening portion, the wall portion being integrally joined to the fixed portion and to an upper edge and lower edge of the opening, the wall portion further being formed with a part of the closed portion and with a part of the outer cylinder, the wall portion extending between the upper edge and the lower edge of the opening, the wall portion having a substantially plate shape.

2. The vehicle outside mirror apparatus according to claim 1, wherein
   the mirror housing is formed using
      a first die that is a slide die to form the opening portion, the fixed portion, and the wall portion;
      a second die that is an ordinary die to form the closed portion, the fixed portion, and the wall portion; and
      a third die that is an ordinary die to form the fixed portion.

3. The vehicle outside mirror apparatus according to claim 1, wherein
   a recess portion or a projection portion is provided in a part of the wall portion corresponding to an edge of the mirror housing, and
   a secure portion that is used to secure the cover is provided in a bottom of the recess portion or a top of the projection portion.

* * * * *